United States Patent
Gloege et al.

(10) Patent No.: US 10,338,278 B2
(45) Date of Patent: Jul. 2, 2019

(54) ANTI-FOG COATING

(71) Applicant: Carl Zeiss Vision International GmbH, Aalen (DE)

(72) Inventors: Thomas Gloege, Aalen (DE); Norbert Hugenberg, Aalen (DE); Bernhard von Blankenhagen, Aalen (DE); Stefan Kraus, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 17 days.

(21) Appl. No.: 15/295,919

(22) Filed: Oct. 17, 2016

(65) Prior Publication Data

US 2017/0031064 A1 Feb. 2, 2017

Related U.S. Application Data

(62) Division of application No. 13/893,021, filed on May 13, 2013, now Pat. No. 9,500,860.

(30) Foreign Application Priority Data

May 15, 2012 (DE) .................. 10 2012 009 691

(51) Int. Cl.
*G02B 27/00* (2006.01)
*G02B 1/18* (2015.01)
(Continued)

(52) U.S. Cl.
CPC .............. *G02B 1/18* (2015.01); *C03C 17/30* (2013.01); *C09D 133/14* (2013.01);
(Continued)

(58) Field of Classification Search
CPC ........ G02B 27/0006; G02B 1/11; G02B 1/10; C09D 183/06; C03C 17/30;
(Continued)

(56) References Cited

U.S. PATENT DOCUMENTS 3,865,619 A 2/1975 Pennewiss et al.
4,026,826 A 5/1977 Yoshida et al.
(Continued)

FOREIGN PATENT DOCUMENTS

DE 35 31 031 A1 3/1987
EP 0 620 255 A1 10/1994
(Continued)

OTHER PUBLICATIONS

Chinese Office action dated Aug. 24, 2017 of parallel Chinese application 201610704568.0 and English translation hereof.
(Continued)

*Primary Examiner* — Ruiyun Zhang
(74) *Attorney, Agent, or Firm* — Walter Ottesen, P.A.

(57) ABSTRACT

The present invention relates to an optical component having a crosslinked anti-fog coating obtainable by covalent attachment of a silane derivative of the formula (2) to the surface of the optical component and crosslinking of adjacent molecules:

$$R_o X_m SiB_n \quad (2)$$

wherein
m=1 to 3, n=1 or 2 and o=0 or 1, with the proviso that m+n+o=4;
the radical X is selected from halogen or $C_{1-4}$-alkoxy, and for m=2 or 3 the individual radicals X may be identical or different,
the radical R is $C_{1-4}$-alkyl,
the radical B has the structure -B1-B2, in which -B2 is a terminal hydrophilic group which is crosslinked to at least one hydrophilic group of an adjacent molecule of the anti-fog coat, and -B1- represents either a spacer group, which joins the hydrophilic group B2 to the Si atom, or a covalent bond,
where the terminal hydrophilic group -B2 is poly(meth)acrylate, and for n=2 the individual radicals B may be identical or different.

7 Claims, 2 Drawing Sheets n = 1, 3

(51) Int. Cl.
  *C09D 183/06* (2006.01)
  *C03C 17/30* (2006.01)
  *C09D 133/14* (2006.01)
  *G02B 1/11* (2015.01)
  *C08G 77/14* (2006.01)

(52) U.S. Cl.
  CPC .............. *C09D 183/06* (2013.01); *G02B 1/11* (2013.01); *G02B 27/0006* (2013.01); *C03C 2217/75* (2013.01); *C03C 2218/111* (2013.01); *C08G 77/14* (2013.01); *Y10T 428/1045* (2015.01)

(58) Field of Classification Search
  CPC ......... C03C 2218/111; C03C 2218/113; C03C 2218/116; C03C 2217/75; Y10T 428/1036; Y10T 428/1045; C08G 77/14; C08G 77/20; C08K 9/06
  USPC ............... 428/1.3, 1.32, 1.51, 339; 359/507; 427/164; 351/62; 523/213; 524/790
  See application file for complete search history.

(56) References Cited

U.S. PATENT DOCUMENTS

| | | | |
|---|---|---|---|
| 5,958,598 A | 9/1999 | Khudyakov et al. | |
| 6,132,861 A | 10/2000 | Kang et al. | |
| 8,057,904 B2 | 11/2011 | Murakami et al. | |
| 8,709,588 B2 | 4/2014 | Cadet et al. | |
| 9,011,970 B2 | 4/2015 | Zheng et al. | |
| 2006/0046046 A1 | 3/2006 | Wang et al. | |
| 2008/0036964 A1 | 2/2008 | Miura et al. | |
| 2008/0207797 A1 | 8/2008 | Takahashi et al. | |
| 2011/0317239 A1 | 12/2011 | Mori et al. | |
| 2012/0019767 A1 | 1/2012 | Cadet et al. | |

FOREIGN PATENT DOCUMENTS

| | | |
|---|---|---|
| JP | 56043367 A | 4/1981 |
| JP | 2000-104046 A | 4/2000 |
| WO | 96/18918 A1 | 6/1996 |
| WO | 2009/144999 A1 | 12/2009 |

OTHER PUBLICATIONS

English translation of Chinese Office action dated Sep. 29, 2014 of parallel Chinese application 201310174406.7.

European Search Report dated Jun. 27, 2013 of parallel European application 13 16 7633.

Partial English translation and the Office action of the German Patent Office dated Dec. 14, 2012 in German patent application 10 2012 009 691.7 on which the claim of priority is based.

English translation and the Office action of the European Patent Office dated Oct. 14, 2015 in corresponding European patent application 13167633.0-1301.

R = H, Me, Et, Na, K n = 1, 3

ANTI-FOG COATING

CROSS REFERENCE TO RELATED APPLICATIONS

This application claims the priority of German patent application no. 10 2012 009 691.7, filed May 15, 2012, the entire content of which is incorporated herein by reference. This application is a divisional application based on U.S. application Ser. No. 13/893,021, filed May 13, 2013, the entire content of which is incorporated herein by reference.

FIELD OF THE INVENTION

The present invention relates to an anti-fog coating on an optical component and also to a method for its production.

BACKGROUND OF THE INVENTION

Present-day eyewear lenses (corrective spectacles, sunglasses, ski/sports eyewear, protective goggles) mist up under adverse conditions. These conditions are, on the one hand, the transition from a cold environment into a warm environment (for example, entering the home from outside in cold temperatures in the winter, or leaving an air-conditioned building in a country with tropical climate conditions), and on the other hand if the eyewear lens makes contact with a source of warm/hot air with high relative humidity. Once the eyewear has misted up, the wearer must typically take off his or her eyewear and either wait until the misting disappears or else remove the misting by wiping with a cloth.

The problem of misting affects optical components in general.

If the misting is looked at under a light microscope, it is observed that the "mist" consists of small droplets of water. These droplets have a diameter of typically 20 µm. The degree of surface occupation by these droplets is approximately 50%, as also predicted by models of kinetic theory. The reason why a misted lens appears milky is that the droplets disrupt the propagation of light.

The reduction in transmission is accompanied by an increase in the scattered light fraction, causing the glass to appear milky. A low contact angle of the water droplets is advantageous, since transmission is then high and the scattered light fraction low.

Given that, under the conditions under which lenses mist up, it is not possible to prevent the condensation of water, one approach at a solution is to treat the surface in such a way that the water drops form a small contact angle with the surface.

Approaches exist for how this can be implemented for optical lenses such as eyewear lenses, for example. These approaches typically involve sprays or liquid-impregnated cloths. The liquids employed in this context are from the group of the hydrophilic surfactants. There is a multiplicity of such products on the market. A phenomenon common to these products is that the anti-mist effect or anti-fog effect is not long-lasting, and it is instead necessary to apply the solution regularly to the surface. There are also approaches which harness physical effects to prevent the development of water drops, examples being venting systems in ski goggles.

There are also solutions for optical lenses such as eyewear lenses which are provided with a hard coating and which ensure a long-lasting anti-mist (anti-fog) effect.

Present-day high-grade optical lenses such as, for example, high-end eyewear lenses are normally provided with an anti-reflection (AR) coating. This coating reduces unwanted and annoying reflections.

There is advantage in managing to modify the surface of AR-coated optical components, such as eyewear lenses, in such a way that a long-lasting anti-mist effect or anti-fog effect is obtained, hence dispensing with the need for regular aftertreatment, with a spray, for example. Particular attention in this context is to be placed on maintaining the optical effect of the anti-reflection coat.

SUMMARY OF THE INVENTION

In accordance with a first aspect, this object is achieved through the provision of an optical component having an anti-fog or anti-mist coating obtainable by covalent attachment of a silane derivative of the formula (1) to the surface of the optical component:

$$R_o X_m SiA_n \tag{1}$$

where $m=1-3$, $n=1-2$ and $o=0-1$, with the proviso that $m+n+o=4$;

the radical X is selected from halogen or $C_{1-4}$-alkoxy, and for $m=2-3$ the individual radicals X may be identical or different, the radical R is $C_{1-4}$alkyl, the radical A has the structure -A1-A2, in which -A1- is a hydrophobic group bonded to the Si atom, and A2 represents a terminal hydrophilic group bonded to the hydrophobic group A1, the hydrophobic group -A1- being selected from -arylene-; alkylene-;

—$C_{1-6}$alkylene-arylene-; -arylene-$C_{1-6}$alkylene-;

—$C_{1-6}$alkylene-arylene-$C_{1-6}$alkylene-; -poly($C_{3-6}$alkoxylene)-, fluorinated or perfluorinated-alkylene-, fluorinated or perfluorinated -poly($C_{2-6}$alkoxylene)-, or a combination of these groups, and the terminal hydrophilic group -A2 is selected from polyethoxyl, poly(meth)acrylate, sulphonic acid or a salt thereof, sulphonic ester, or a combination of these groups, and for $n=2$ the individual radicals A may be identical or different.

The covalent attachment of the compound of the formula (1) to the surface of the optical component is accomplished by reacting at least one of the reactive, hydrolyzable —Si—X— groups with a suitable reactive surface group (e.g. an —OH group) to form —Si—O—. This type of surface attachment of a silicon compound having a reactive, hydrolyzable group is known in principle to the skilled person.

Preferably X is methoxy, ethoxy or Cl.

In the context of the present invention it has been found that through a radical A on the Si atom with the structure -A1-A2, which features a suitable combination of hydrophobic group -A1- and terminal hydrophilic group -A2, on the one hand the —Si—O— bond, via which the molecules of the anti-fog coating are bonded to the surface of the optical component, is shielded more effectively from water, and the stability of the anti-fog coating with respect to hydrolysis can be enhanced, and, furthermore, the contact angle of the water to the anti-fog coating is kept low.

In the context of the present invention it has also emerged that the presence of a suitable hydrophobic group -A1- in the compound of the formula (1) significantly reduces the unwanted adsorption of the hydrophilic group -A2 on the surface of the optical component, leading in turn to an increased occupation density of the molecules of the anti-fog coat on the surface of the optical component.

As set out above, the hydrophobic group -A1- is selected from -arylene-; —$C_{1-6}$alkylene-arylene-; -arylene-$C_{1-6}$alkylene-; —$C_{1-6}$alkylene-arylene-$C_{1-6}$alkylene-; -poly($C_{3-6}$alkoxylene)-, fluorinated or perfluorinated -alkylene-, fluorinated or perfluorinated -poly($C_{3-6}$alkoxylene)-, or a combination of these groups.

From the structure -A1-A2 of the radical A it is evident that the hydrophobic group is at least divalent—that is, is joined by a covalent bond to each of the two adjacent groups. In the text below, the name of any such divalent group carries the ending "-ene". For example, the term "arylene" refers below to a divalent aryl group.

The arylene group —Ar— is preferably phenylene -Ph-, which may be substituted or unsubstituted. The arylene group may optionally be connected via a (divalent) $C_{1-6}$alkylene group, which is optionally fluorinated or perfluorinated, to the Si atom and/or to the terminal hydrophilic group -A2.

An example of a suitable alkylene group is —$C_{1-10}$alkylene-.

-Poly($C_{3-6}$-alkoxylene)- is preferably a polypropoxylene and/or polybutoxylene group. In the context of the present invention it has emerged that -poly($C_{3-6}$-alkoxylene)- has sufficient hydrophobicity to improve the stability of the anti-fog coating with respect to hydrolysis. The degree of alkoxylation, i.e. the number of $C_{3-6}$-alkoxylene monomer units in the poly($C_{3-6}$-alkoxylene)- group, can be varied over a wide range and is situated for example in the range from 1 to 8, more preferably 2 to 8.

In the context of the present invention, a perfluorinated alkylene group means an alkylene group in which all of the hydrogen atoms are substituted by fluorine. The number of C atoms in the fluorinated or perfluorinated alkylene group and hence the length of the group can be varied over a wide range. The fluorinated or perfluorinated alkylene group is preferably a fluorinated or perfluorinated $C_{1-20}$-alkylene group, more preferably fluorinated or perfluorinated $C_{1-10}$-alkylene.

In the context of the present invention, a perfluorinated poly($C_{2-6}$-alkoxylene) group means a poly($C_{2-6}$-alkoxylene) group in which all of the hydrogen atoms are substituted by fluorine. Exemplary poly($C_{2-6}$-alkoxylene) groups that can be identified are polyethoxylene, polypropoxylene or polybutoxylene. The degree of alkoxylation, i.e. the number of $C_{2-6}$-alkoxylene monomer units in the fluorinated or perfluorinated poly($C_{2-6}$-alkoxylene) group, can be varied over a wide range and is situated for example in the range from 1 to 8, more preferably 2 to 8.

As stated above, the terminal hydrophilic group -A2 is selected from polyethoxyl, poly(meth)acrylate, sulphonic acid or a salt thereof, sulphonic ester, or a combination of these groups.

The degree of ethoxylation of the polyethoxy group can be varied over a wide range and is situated for example in the range from 4 to 20.

The sulphonic ester in question is preferably the methyl or ethyl ester.

Where the hydrophilic group -A2 comprises a poly(meth)acrylate, the latter may be constructed exclusively from identical monomer units such as $CH_2$=$C(CH_3)COOC_{1-4}$-alkyl (e.g. $CH_2$=$C(CH_3)COOCH_3$), $CH_2$=$C(H)COOC_{1-4}$-alkyl (e.g. $CH_2$=$C(H)COOCH_3$), hydroxyethylene methacrylate (HEMA), 2-acrylamido-2-methylpropanesulphonic acid (AMPS), trimethylolpropane triacrylate or pentaerythritol tetraacrylate, or from mixtures of these monomer units, and may alternatively also contain further comonomer units.

The poly(meth)acrylate as hydrophilic group A2 may be linked for example via an ester group with the hydrophobic group -A1-.

In the context of the present invention it is possible for adjacent molecules of the formula (1) of the anti-fog coating to be crosslinked via covalent bonds of the hydrophilic groups -A2, especially if -A2 is polyethoxyl or poly(meth)acrylate. This may lead to even better shielding of the —Si—O— bond toward water. If, however, the compound has the above-described structure with -A1-A2, then this leads, even without crosslinking, to enhanced stability with respect to hydrolysis.

BRIEF DESCRIPTION OF THE DRAWINGS

The invention will now be described with reference to the drawings wherein.

Figure 1:
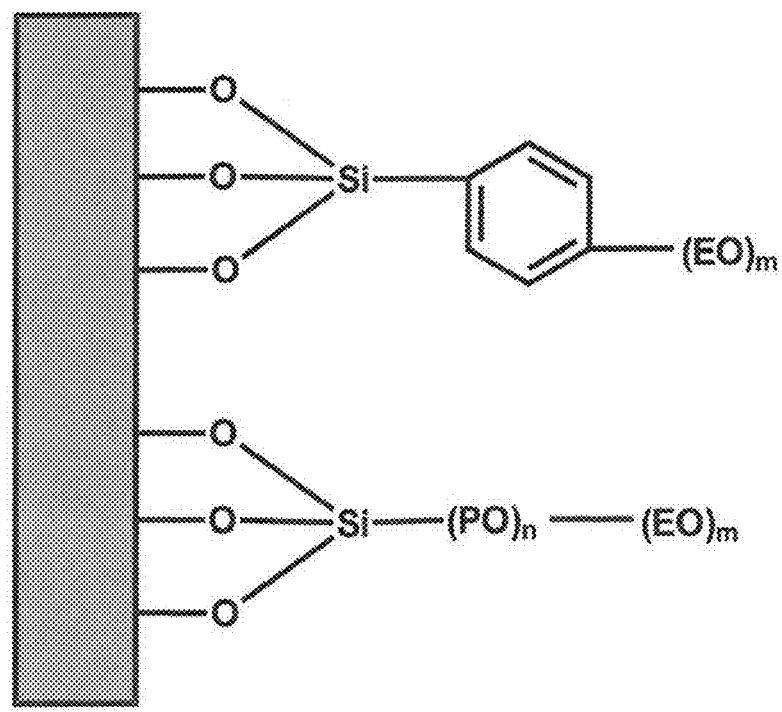
FIG. 1 shows, diagrammatically, the surface of an optical component that has been modified with silane compounds of the formula (1) to form an anti-fog coating. In the upper compound of FIG. 1, the hydrophobic group -A1- is a -phenylene- and the terminal hydrophilic group is polyethoxy. In the lower compound of FIG. 1, the hydrophobic group -A1- is a -poly(propoxylene)- and the terminal hydrophilic group is again polyethoxy.
Figure 2:
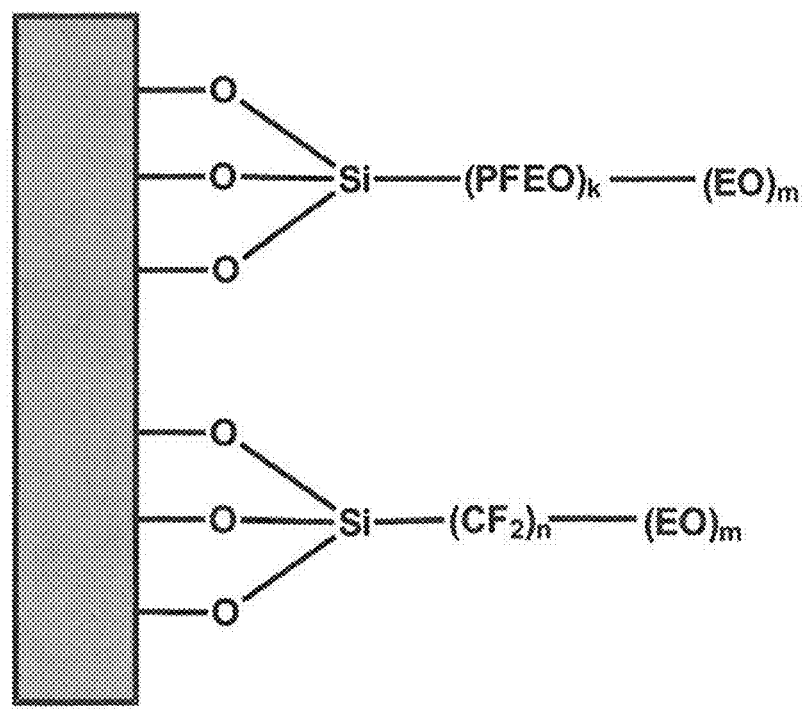
FIG. 2 shows diagrammatically the surface of an optical component that has been modified with silane compounds of the formula (1) to form an anti-fog coating. In the upper compound of FIG. 2, the hydrophobic group -A1- is a perfluorinated -poly(propoxylene)- and the terminal hydrophilic group is polyethoxy. In the lower compound of FIG. 2, the hydrophobic group -A1- is a perfluorinated -alkylene- and the terminal hydrophilic group is again polyethoxy.
Figure 3:
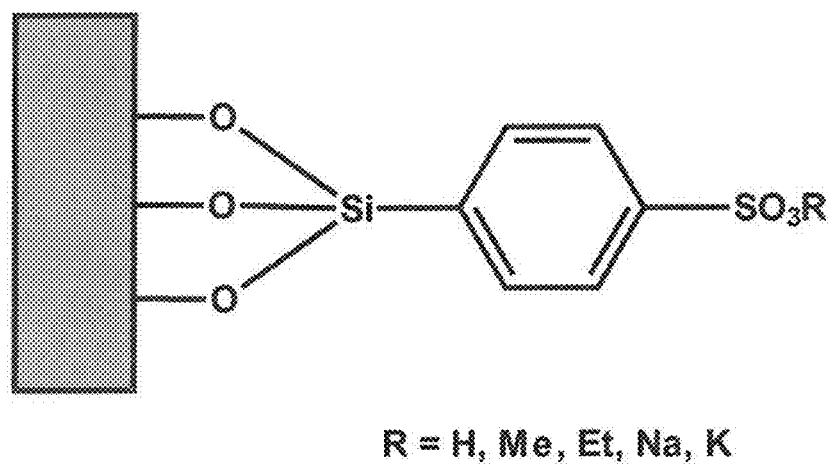
FIG. 3 shows diagrammatically the surface of an optical component that has been modified with silane compounds of the formula (1) to form an anti-fog coating. In the compound of FIG. 3 the hydrophobic group -A1- is a -phenylene- and the terminal hydrophilic group is a sulphonic acid or a sulphonic ester.

DESCRIPTION OF THE PREFERRED
EMBODIMENTS OF THE INVENTION

The optical component may comprise, for example, optical lenses made of glass or plastic, or else a beam splitter component. Mention may be made by way of example in this context of eyewear lenses, telescope lenses, cover plates or cover glasses, or else lenses such as ocular lenses, camera lenses or front lenses.

In one preferred embodiment the optical component has an anti-reflection coat (AR coat). The anti-fog coating may be applied directly on the AR coat.

The coat thickness of the anti-fog coating may be varied over a wide range, for example from a monomolecular (i.e. single-layer) coat through to a multi-layer coat with a coat thickness of up to 150 nm. Where the optical component has an anti-reflection coat (AR coat), the coat thickness of the anti-fog coating is preferably selected so as not to impair the function of the AR coat. Where the anti-fog coating is present on an AR coat, the coat thickness of the anti-fog coating is preferably in the range from single-layer to 100 nm, more preferably in the range from 10 nm to 20 nm.

Silane derivatives of the formula (1) are available commercially or can be prepared via synthesis techniques known to the skilled person.

Methods for the covalent attachment of silane derivatives to reactive surfaces are known in principle to the skilled person. According to one variant, the silane derivative in a suitable solvent is contacted with the surface under reactive conditions. Alternatively, the silane derivative can also be reacted with the surface via the gas phase.

According to a further aspect, the present invention relates to a method for producing an anti-fog coating on an optical component, comprising the provision of the optical component and the covalent attachment of the silane derivative of the formula (1) by chemical reaction with reactive groups on the surface of the optical component.

With regard to the properties of the silane derivative of the formula (1) and of the optical component, reference may be made to the statements above.

According to a further aspect, the present invention relates to the use of the silane derivative of the formula (1) for providing an anti-fog coating on an optical component.

According to a further aspect, the present invention relates to an optical component having a crosslinked anti-fog coating obtainable by covalent attachment of a silane derivative of the formula (2) to the surface of the optical component and crosslinking of adjacent molecules:

$$R_oX_mSiB_n \qquad (2)$$

where m=1-3, n=1-2 and o=0-1, with the proviso that m+n+o=4;

the radical X is selected from halogen or $C_{1-4}$-alkoxy, and for m=2-3 the individual radicals X may be identical or different, the radical R is $C_{1-4}$alkyl, the radical B has the structure -B1-B2, in which -B2 is a terminal hydrophilic group which is crosslinked to at least one hydrophilic group of an adjacent molecule of the anti-fog coat, and -B1- represents either a spacer group, which joins the hydrophilic group B2 to the Si atom, or a covalent bond, where the terminal hydrophilic group -B2 is selected from polyethoxy, poly(meth)acrylate, sulphonic acid or a salt thereof, sulphonic ester, or a combination of these groups, and for n=2 the individual radicals B may be identical or different.

The covalent attachment of the compound of the formula (2) to the surface of the optical component is accomplished by reacting at least one of the reactive, hydrolyzable —Si—X— groups with a suitable reactive surface group (e.g. an —OH group) to form —Si—O—. This type of surface attachment of a silicon compound having a reactive, hydrolyzable group is known in principle to the skilled person.

Preferably X is methoxy, ethoxy or Cl.

In the context of the present invention it has been found that through the selection of suitable hydrophilic groups in the silane derivative of formula (2) and the crosslinking of adjacent molecules in the anti-fog coating, on the one hand the —Si—O— bond, via which the molecules of the anti-fog coating are bonded to the surface of the optical component, is shielded more effectively from water, and the stability of the anti-fog coating with respect to hydrolysis can be enhanced, and, furthermore, the contact angle of the water to the anti-fog coating is kept low.

In the context of the present invention it has also emerged that the crosslinked anti-fog of the invention significantly reduces the unwanted adsorption of the hydrophilic group -B2 on the surface of the optical component, leading in turn to an increased occupation density of the molecules of the anti-fog coat on the surface of the optical component.

As stated above, the terminal hydrophilic group -B2 is selected from polyethoxy, poly(meth)acrylate, sulphonic acid or a salt thereof, sulphonic ester, or a combination of these groups.

With regard to the properties of these hydrophilic groups, reference may be made to the above statements concerning the description of the silane derivative (1).

The degree of ethoxylation of the polyethoxy group can be varied over a wide range and is situated for example in the range from 4 to 20.

Where the hydrophilic group -B2 comprises a poly(meth)acrylate, the latter may be constructed exclusively from identical monomer units such as $CH_2=C(CH_3)COOC_{1-4}$-alkyl (e.g. $CH_2'C(CH_3)COOCH_3$), $CH_2=C(H)COOC_{1-4}$-alkyl (e.g. $CH_2=C(H)COOCH_3$), hydroxyethylene methacrylate (HEMA), 2-acrylamido-2-methylpropanesulphonic acid (AMPS), trimethylolpropane triacrylate or pentaerythritol tetraacrylate, or from a mixture of these monomer units, and may alternatively also contain further comonomer units. The poly(meth)acrylate as hydrophilic group B2 may be linked for example via an ester group with the spacer group -B1- or the Si atom.

The sulphonic ester in question is preferably the methyl or ethyl ester.

In the context of the present invention the spacer group where present, may be varied to a broad extent. A suitable spacer group, for example, is an alkylene group such as $C_{1-8}$alkylene, more preferably $C_{1-3}$alkylene.

Silane derivatives of the formula (2) are available commercially or can be prepared via synthesis techniques known to the skilled person.

Methods for the covalent attachment of silane derivatives to reactive surfaces are known in principle to the skilled person. According to one variant, the silane derivative in a suitable solvent is contacted with the surface under reactive conditions. Alternatively, the silane derivative can also be reacted with the surface via the gas phase.

According to a further aspect, the present invention relates to a method for producing a crosslinked anti-fog coating on an optical component, comprising the provision of the optical component and the covalent attachment of the silane derivative of the formula (2) by chemical reaction with reactive groups on the surface of the optical component, followed by the crosslinking of the hydrophilic groups -B2 of adjacent molecules of the anti-fog coating.

Suitable reaction conditions for the crosslinking of adjacent molecules having suitable reactive groups are known to the skilled person. Where the crosslinking takes place via a radical reaction, it is possible to use radical initiators such as dichlorodicyanoquinone (DDQ), for example. With certain groups, crosslinking may also be initiated by exposure to UV radiation.

With regard to the properties of the silane derivative of the formula (2) and of the optical component, reference may be made to the statements above.

According to a further aspect, the present invention relates to the use of the silane derivative of the formula (2) for providing an anti-fog coating on an optical component.

In the context of the present invention it is also possible to produce the crosslinked anti-fog coating on the optical component by first covalently bonding a suitable precursor compound for the silane derivative of the formula (2) on the surface of the optical component, this precursor compound having a terminal group with suitable functionality and thus allowing subsequent chemical reaction with suitable reactants to give the silane derivative of the formula (2).

In accordance with a further aspect, the present invention relates to a method for producing a crosslinked anti-fog coating on an optical component, where first a precursor compound of the formula (3) is bonded covalently to the surface of the optical component:

where m=1-3, n=1-2 and o=0-1, with the proviso that m+n+o=4, the radical X is selected from halogen or $C_{1-4}$-alkoxy, and for m=2-3 the individual radicals X may be identical or different, the radical R is $C_{1-4}$alkyl, the radical C has the structure -C1-C2, in which -C2 is a terminal group having a (meth)acrylate functionality and -C1- represents either a spacer group, which corresponds to the above-described spacer group -B1-, or a covalent bond, and the terminal group C2 is reacted with (meth)acrylate monomers to give a hydrophilic poly(meth)acrylate group, followed by the crosslinking of the hydrophilic poly(meth) acrylate groups of adjacent molecules of the anti-fog coating.

Examples of (meth)acrylate monomers that may be identified as suitable monomers are $CH_2$=$C(CH_3)COOC_{1-4}$-alkyl (e.g. $CH_2$=$C(CH_3)COOCH_3$), $CH_2$=$C(H)COOC_{1-4}$ alkyl (e.g. $CH_2$=$C(H)COOCH_3$), hydroxyethylene methacrylate (HEMA), 2-acrylamido-2-methylpropanesulphonic acid (AMPS), trimethylolpropane triacrylate or pentaerythritol tetraacrylate or mixtures thereof.

Figure 4:
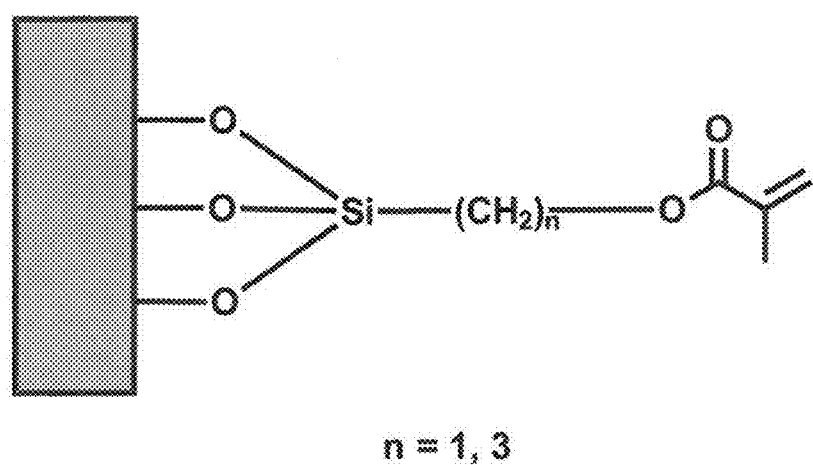
FIG. 4 shows, diagrammatically, a surface of an optical component that has been coated with a precursor compound of the formula (3).

FIG. 4 shows, diagrammatically, a surface of an optical component that has been coated with a precursor compound (3). The terminal group of the precursor compound has a (meth)acrylate functionality, which allows the reaction with further (meth)acrylate monomers and hence the construction of a hydrophilic poly(meth)acrylate group.

In the following further embodiments of the invention are described.

Embodiment 1

An optical component having an anti-fog coating obtainable by covalent attachment of a silane derivative of the formula (1) to the surface of the optical component:

wherein m=1 to 3, n=1 or 2 and o=0 or 1, with the proviso that m+n+o=4;

the radical X is selected from halogen or $C_{1-4}$-alkoxy, and for m=2 or 3 the individual radicals X may be identical or different, the radical R is $C_{1-4}$alkyl, the radical A has the structure -A1-A2, in which -A1- is a hydrophobic group bonded to the Si atom, and -A2 represents a terminal hydrophilic group bonded to the hydrophobic group A1, the hydrophobic group -A1- being selected from -arylene-; —$C_{1-6}$-alkylene-arylene-; -arylene-$C_{1-6}$-alkylene-; —$C_{1-6}$-alkylene-arylene-$C_{1-6}$-alkylene-; -poly($C_{3-6}$-alkoxylene)-, fluorinated or perfluorinated -alkylene-, fluorinated or perfluorinated -poly($C_{2-6}$-alkoxylene)-, or a combination of these groups, and the terminal hydrophilic group -A2 is poly(meth) acrylate, and for n=2 the individual radicals A may be identical or different, and where the poly(meth)acrylate of the terminal hydrophilic group -A2 comprises monomer units which are selected from $CH_2$=$C(CH_3)COOC_{1-4}$-alkyl, $CH_2$=$C(H)COOC_{1-4}$-alkyl, hydroxyethylene methacrylate, 2-acrylamido-2-methylpropanesulphonic acid, trimethylolpropane triacrylate and pentaerythritol tetraacrylate or mixtures thereof.

Embodiment 2

The optical component according to Embodiment 1, where the anti-fog coating has no crosslinking between hydrophilic groups -A2 and/or hydrophobic groups -A1- of adjacent molecules.

Embodiment 3

The optical component according to Embodiment 1, where the anti-fog coating has crosslinking between hydrophilic groups -A2 and/or hydrophobic groups -A1- of adjacent molecules.

Embodiment 4

An optical component having a crosslinked anti-fog coating obtainable by covalent attachment of a silane derivative of the formula (2) to the surface of the optical component and crosslinking of adjacent molecules:

wherein m=1 to 3, n=1 or 2 and o=0 or 1, with the proviso that m+n+o=4;

the radical X is selected from halogen or $C_{1-4}$-alkoxy, and for m=2 or 3 the individual radicals X may be identical or different, the radical R is $C_{1-4}$-alkyl, the radical B has the structure -B1-B2, in which -B2 is a terminal hydrophilic group which is crosslinked to at least one hydrophilic group of an adjacent molecule of the anti-fog coat, and -B1- represents either a spacer group, which joins the hydrophilic group B2 to the Si atom, or a covalent bond, where the terminal hydrophilic group -B2 is poly(meth) acrylate, and for n=2 the individual radicals B may be identical or different, and where the poly(meth)acrylate of the terminal hydrophilic group -B2 comprises monomer units which are selected from $CH_2$=$C(CH_3)COOH_{1-4}$-alkyl, $CH_2$=$C(H)COOCH_{1-4}$-alkyl, hydroxyethylene methacrylate, 2-acrylamido-2-methylpropanesulphonic acid, trimethylolpropane triacrylate and pentaerythritol tetraacrylate or mixtures thereof.

Embodiment 5

The optical component according to Embodiment 1, where the covalent attachment of the compound of the formula (1) to the surface of the optical component takes place by reacting at least one of the reactive —Si—X— groups with a suitable reactive surface group to form —Si—O—.

Embodiment 6

The optical component according to Embodiment 1, where the optical component comprises an anti-reflection coat and the anti-fog coating is applied to the anti-reflection coat.

Embodiment 7

A method for producing a crosslinked anti-fog coating on an optical component comprising:
  covalently bonding a precursor compound to the surface of the optical component, the precursor compound having the formula (3):

$$R_o X_m SiC_n \qquad (3)$$

wherein
  m=1 to 3, n=1 or 2 and o=0 or 1, with the proviso that m+n+o=4,
  the radical X is selected from halogen or $C_{1-4}$-alkoxy, and for m=2 or 3 the individual radicals X may be identical or different,
  the radical R is $C_{1-4}$-alkyl,
  the radical C has the structure -C1-C2, in which -C2 is a teiminal group having a (meth)acrylate functionality and -C1- represents either a spacer group or a covalent bond;
    reacting the terminal group -C2 with (meth)acrylate monomers to give a hydrophilic poly(meth)acrylate group; and,
    crosslinking of the hydrophilic poly(meth)acrylate groups of adjacent molecules.

Embodiment 8

A method for producing a crosslinked anti-fog coating on an optical component according to Embodiment 4, comprising:
  providing the optical component and the covalent attachment of the silane derivative of the formula (2) by chemical reaction with reactive groups on the surface of the optical component, followed by the crosslinking of the hydrophilic groups -B2 of adjacent molecules of the anti-fog coating.

Embodiment 9

A method for producing an anti-fog coating on an optical component, according to Embodiment 1, comprising:
  providing of the optical component and the covalent attachment of the silane derivative of the formula (1) by chemical reaction with reactive groups on the surface of the optical component.

Embodiment 10

The optical component according to Embodiment 4, where the covalent attachment of the compound of the formula (2) to the surface of the optical component takes place by reacting at least one of the reactive —Si—X— groups with a suitable reactive surface group to form —Si—O—.

Embodiment 11

The optical component according to Embodiment 6, where the anti-fog coating having a coat thickness of 100 nm or less.

The invention is described in further detail by the following examples:

EXAMPLES

Example 1

A polyethylene glycol (PEG) modified trichlorosilane (Mn~500 g/mol) is dissolved in toluene so that a 5 mass % solution is obtained. A glass having an antireflective coating but no CleanCoat is dipped into the solution and then air-dried. Any remaining over-coating is removed by rubbing with a dry cloth.

Example 2

A polyethylene glycol (PEG) modified trichlorosilane (Mn~500 g/mol) is dissolved in toluene so that a 2.5 mass % solution is obtained. A glass having an antireflective coating but no CleanCoat is dipped into the solution and then air-dried. Any remaining over-coating is removed by rubbing with a dry cloth.

By covalently attaching the PEG-modified silane to the substrate surface, coatings are obtained in Examples 1 and 2 which provide anti-fogging properties. Due to the higher concentration of the PEG-modified silane, the anti-fogging effect provided in Example 1 is higher than in Example 2.

Example 3

9.98 g 3-methacryloxypropyl trichlorosilane are dissolved in 490 ml toluene. A glass is stored in said solution for one hour and then air-dried. In a second step, the glass is dipped into a solution made of 5.0 g 2-hydroxyethyl methacrylate (HEMA), 1.0 g trimethylol propanetriacrylate (TMPTA) and 0.5 g diphenyl-(2,4,6-trimethylbenzoyl)phosphine oxide in 50 ml toluene, followed by curing with a Panacol UV-D-1000 lamp.

Example 4

10.01 g 3-methacryloxypropyl trichlorosilane are dissolved in 240 ml toluene. A glass having an antireflective coating is stored in said solution for one hour and then air-dried. In a second step, the glass is dipped into a solution made of 10.0 g 2-hydroxyethyl methacrylate (HEMA), 3.0 g trimethylol propanetriacrylate (TMPTA) and 0.5 g diphenyl-(2,4,6-trimethylbenzoyl)phosphine oxide in 100 ml toluene, followed by curing with a Panacol UV-D-1000 lamp.

So, in Examples 3 and 4, a precursor compound having a terminal methacrylate functionality is covalently attached to the substrate surface in a first step, followed by a second step which includes a chemical reaction with further (meth)acrylate monomers so as to obtain the terminal poly(meth)acrylate group, and a crosslinking of neighbouring molecules.

The coatings prepared in Examples 3 and 4 both provide an antifogging effect.

A higher percentage of the monomer hydroxyethyl methacrylate increases the hydrophilic character of the coating and thereby its antifogging effect, whereas a higher percentage of the monomer trimethylolpropane triacrylate increases the crosslinking within the coating and thereby improves mechanical properties.

It is understood that the foregoing description is that of the preferred embodiments of the invention and that various changes and modifications may be made thereto without departing from the spirit and scope of the invention as defined in the appended claims.

What is claimed is:

1. An optical component comprising a crosslinked anti-fog coating produced by covalent attachment of a silane derivative of the formula (2) to the surface of the optical component and crosslinking of adjacent molecules:

$$R_oX_mSiB_n \qquad (2)$$

wherein:
m=1 to 3,
n=1 or 2, and
o=0 or 1,
with the proviso that m+n+o=4;
the radical X is selected from a halogen or $C_{1-4}$ alkoxy, and for m=2 or 3 the individual radicals X are identical or different,
the radical R is $C_{1-4}$-alkyl,
the radical B has the structure -B1-B2, in which -B2 is a terminal hydrophilic group which is crosslinked to at least one hydrophilic group of an adjacent molecule of the anti-fog coat, and -B1- represents either a spacer group, which joins the hydrophilic group B2 to the Si atom, or a covalent bond,
the terminal hydrophilic group -B2 is poly(meth)acrylate, and for n=2 the individual radicals B are identical or different, and
the anti-fog coating has a coat thickness of 100 nm or less.

2. The optical component according to claim 1, where the covalent attachment of the compound of the formula (2) to the surface of the optical component takes place by reacting at least one of the reactive —Si—X— groups with a suitable reactive surface group to form —Si—O—.

3. The optical component according to claim 1, where the optical component comprises an anti-reflection coat and the anti-fog coating is applied to the anti-reflection coat.

4. The optical component according to claim 1, wherein the poly(meth)acrylate of the terminal hydrophilic group -B2 comprises monomer units which are selected from $CH_2$=$C(CH_3)$ $COOC_{1-4}$-alkyl, $CH_2$=$C(H)$ $COOC_{1-4}$-alkyl, hydroxyethylene methacrylate, 2-acrylamido-2-methylpropanesulphonic acid, trimethylolpropane triacrylate and pentaerythritol tetraacrylate or mixtures thereof.

5. A method for producing a crosslinked anti-fog coating on an optical component comprising:
covalently bonding a precursor compound to the surface of the optical component, the precursor compound having the formula (3):

$$R_oX_mSiC_n \qquad (3)$$

wherein:
m=1 to 3,
n=1 or 2, and
o=0 or 1,
with the proviso that m+n+o=4,
the radical X is selected from a halogen or $C_{1-4}$ alkoxy, and for m=2 or 3 the individual radicals X are identical or different,
the radical R is $C_{1-4}$-alkyl,
the radical C has the structure -C1-C2, in which -C2 is a terminal group comprising a (meth)acrylate functionality and -C1- represents either a spacer group or a covalent bond;
reacting the terminal group -C2 with (meth)acrylate monomers to give a hydrophilic poly(meth)acrylate group; and,
crosslinking of the hydrophilic poly(meth)acrylate groups of adjacent molecules,
wherein the step of covalently bonding a precursor compound to the surface of the optical component does not include a surfactant in the step or in the precursor compound bonded to the surface of the optical component.

6. The method according to claim 5, comprising:
providing the optical component and the covalent attachment of the silane derivative of the formula (3) by chemical reaction with reactive groups on the surface of the optical component, followed by the crosslinking of the hydrophilic groups C2 of adjacent molecules of the anti-fog coating.

7. The method according to claim 5, wherein the (meth)acrylate monomers are selected from the group consisting of $CH_2$=$C(CH_3)COOC_{1-4}$-alkyl, $CH_2$=$C(H)COOC_{1-4}$-alkyl, hydroxyethylene methacrylate, 2-acrylamido-2-methylpropanesulphonic acid, trimethylolpropane triacrylate and pentaerythritol tetraacrylate or mixtures thereof.

* * * * *

UNITED STATES PATENT AND TRADEMARK OFFICE
CERTIFICATE OF CORRECTION

PATENT NO. : 10,338,278 B2  
APPLICATION NO. : 15/295919  
DATED : July 2, 2019  
INVENTOR(S) : T. Gloege et al.

Page 1 of 1

It is certified that error appears in the above-identified patent and that said Letters Patent is hereby corrected as shown below:

In the Specification

<u>In Column 6:</u>
Line 16: delete "(e.g. $CH_2'C(CH_3)COOCH_3$)," and substitute -- (e.g. $CH_2=C(CH_3)COOCH_3$), -- therefor.

<u>In Column 8:</u>
Line 54: delete "$CH_2=C(CH_3)COOH_{1-4}$-alkyl" and substitute -- $CH_2=C(CH_3)COOC_{1-4}$-alkyl -- therefor.
Line 54/55: delete "$CH_2=C(H)COOCH_{1-4}$-alkyl" and substitute -- $CH_2=C(H)COOC_{1-4}$-alkyl -- therefor.

<u>In Column 9:</u>
Line 25: delete "teiminal group" and substitute -- terminal group -- therefor.

Signed and Sealed this  
Seventh Day of January, 2020

Andrei Iancu  
*Director of the United States Patent and Trademark Office*